US012547659B2

(12) United States Patent
Jia et al.

(10) Patent No.: US 12,547,659 B2
(45) Date of Patent: Feb. 10, 2026

(54) QUERY IMAGE GENERATION IN SEARCH SYSTEMS USING GENERATIVE ARTIFICIAL INTELLIGENCE (AI)

(71) Applicant: Maplebear Inc., San Francisco, CA (US)

(72) Inventors: Fei Jia, Kirkland, WA (US); Rory Jesse Shevin, San Francisco, CA (US); Manmeet Singh, Santa Clara, CA (US); Tejaswi Tenneti, San Carlos, CA (US); Lee Cohn, Chicago, IL (US); Jacob Jensen, Metuchen, NJ (US); Esther Vasiete Allas, New York, NY (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 19/055,375

(22) Filed: Feb. 17, 2025

(65) Prior Publication Data

US 2025/0265290 A1 Aug. 21, 2025

Related U.S. Application Data

(60) Provisional application No. 63/557,403, filed on Feb. 23, 2024, provisional application No. 63/556,801, (Continued)

(51) Int. Cl.
*G06F 16/50* (2019.01)
*G06F 16/538* (2019.01)
(Continued)

(52) U.S. Cl.
CPC .......... *G06F 16/538* (2019.01); *G06F 16/953* (2019.01)

(58) Field of Classification Search
CPC .............................. G06F 16/538; G06F 16/95
See application file for complete search history.

(56) References Cited

U.S. PATENT DOCUMENTS

| 12,020,470 | B1* | 6/2024 | Saraee | G06F 16/951 |
| 2014/0310255 | A1* | 10/2014 | Cardell | G06F 16/90324 |
| | | | | 707/706 |
| 2025/0131034 | A1* | 4/2025 | De Juan | G06F 16/538 |

OTHER PUBLICATIONS

Zheng-Jun Zha et al., Visual query suggestion: Towards capturing user intent in internet image search. 2010 [retrieved Sep. 23, 2025]. ACM Trans. Multimedia Comput. Commun. Appl. 6, 3, Article 13 (Aug. 2010). Retrieved from the Internet: https://doi.org/10.1145/1823746.1823747 (Year: 2010).*

* cited by examiner

*Primary Examiner* — Kristopher Andersen
(74) *Attorney, Agent, or Firm* — Fenwick & West LLP

(57) ABSTRACT

An online system performs an inference task in conjunction with the model serving system and/or interface system to generate relevant product images for query auto-completion and query suggestion to help users better navigate their search experience. The online system generates a collection of query suggestions using search query log mining. For each query suggestion in the collection of query suggestions, the online system retrieves one or more catalog images that depict the query suggestion from a product catalog. The online system constructs a prompt to a text-to-image model including the query suggestion, and a request to generate one or more query images based on the query suggestion. The online system receives the query images from the text-to-image model and ranks the catalog and query images to identify an image to display to the user in association with the query suggestion.

18 Claims, 7 Drawing Sheets

Related U.S. Application Data filed on Feb. 22, 2024, provisional application No. 63/554,988, filed on Feb. 17, 2024.

(51) Int. Cl.
*G06F 16/90* (2019.01)
*G06F 16/953* (2019.01)

QUERY IMAGE GENERATION IN SEARCH SYSTEMS USING GENERATIVE ARTIFICIAL INTELLIGENCE (AI)

CROSS-REFERENCE TO RELATED APPLICATIONS

This application claims the benefit of U.S. Provisional Patent Application No. 63/557,403, filed on Feb. 23, 2024, U.S. Provisional Patent Application No. 63/554,988, filed on Feb. 17, 2024, and U.S. Provisional Patent Application No. 63/556,801, filed on Feb. 22, 2024, all of which are incorporated herein by reference in their entirety.

BACKGROUND

An online system may include an interface with a search bar that receives a user's search queries. For example, the online system may connect users and retailers, and users may submit search queries for relevant items. The online system may generate and display query suggestions to the user. To help users better understand the query suggestions, the search bar may display images related to the query suggestions. However, the images may not represent the query suggestions well and may not be the most appealing images to users. Moreover, the online system may perform query auto-completion and generate query suggestions to improve a user's experience. However, conventional query auto-completion and suggestion systems typically used in search require several stages and may not be configured to yield success in online platforms, such as e-commerce applications.

SUMMARY

In accordance with one or more embodiments, an online system obtains a collection of query suggestions from previous search queries submitted to a search interface of an online system. For each query suggestion in the collection of query suggestions, the online system generates a prompt for input to a machine-learning text-to-image model, the prompt specifying at least the query suggestion, and a request to generate one or more query images for the query suggestion. The online system receives a response generated by executing the machine-learning text-to-image model on the prompt to obtain the one or more query images. The online system obtains a set of query images for the query suggestion, the set of query images including at least the one or more query images obtained from the machine-learning text-to-image model. The online system identifies, for a user, an opportunity to present at least one query suggestion from the collection of query suggestions. The online system ranks the respective set of query images for the at least one query suggestion to select an image for presentation to the user. The online system transmits instructions to a client device to cause display of the at least one query suggestion and the selected image at a search interface.

DETAILED DESCRIPTION

Figure 1A:
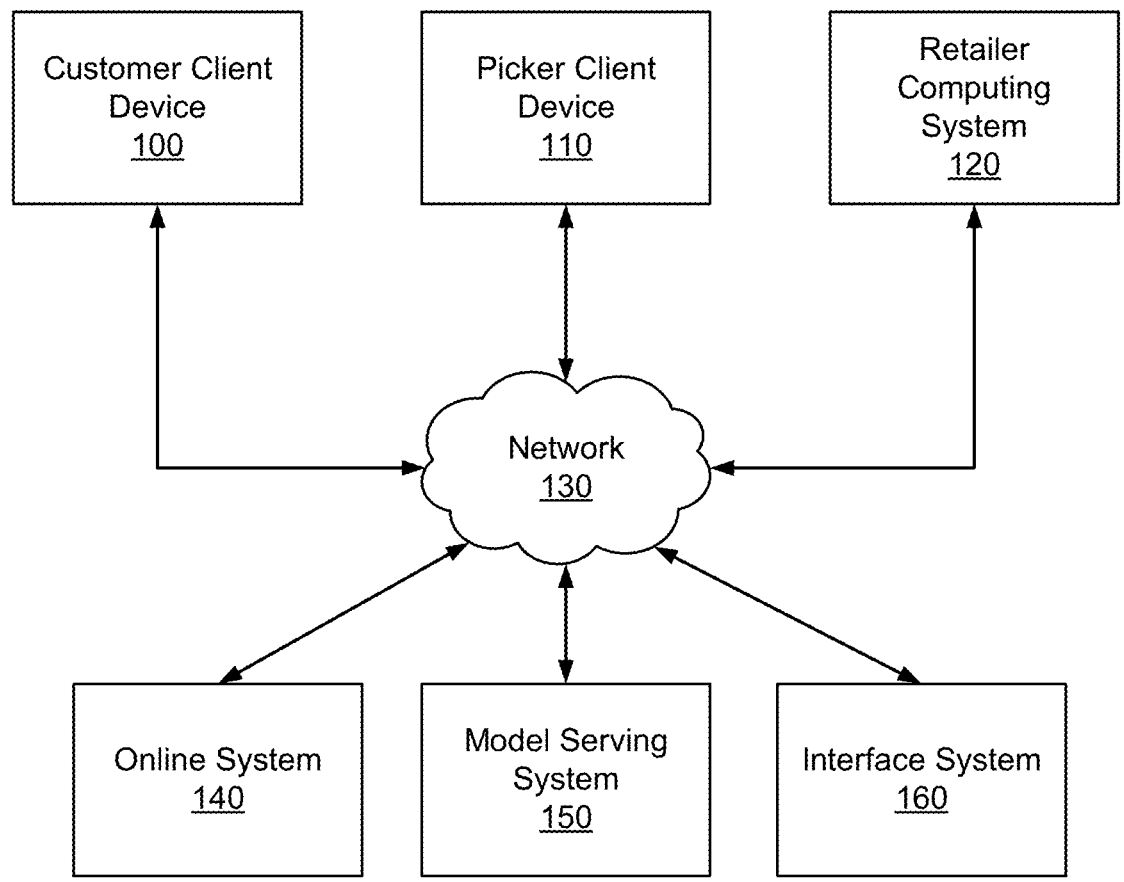
FIG. 1A illustrates an example system environment for an online system, in accordance with one or more embodiments.

FIG. 1A illustrates an example system environment for an online system 140, in accordance with one or more embodiments. The system environment illustrated in FIG. 1A includes a customer client device 100, a picker client device 110, a retailer computing system 120, a network 130, and an online system 140. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item", as used herein, means a good or product that can be provided to the customer through the online system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The customer client device 100, the picker client device 110, the retailer computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provide portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer's client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. The online system 140 is described in further detail below with regards to FIG. 2.

The model serving system 150 receives requests from the online system 140 to perform inference tasks using machine-learned models. The inference tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbot applications, and the like. In one or more embodiments, the language model is configured as a transformer neural network architecture. Specifically, the transformer model is coupled to receive sequential data tokenized into a sequence of input tokens and generates a sequence of output tokens depending on the inference task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many inference tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units (GPUs) for training or deploying deep neural network models. In one instance, the LLM may be trained and hosted on a cloud infrastructure service. The LLM may be trained by the online system 140 or entities/systems different from the online system 140. An LLM may be trained on a large amount of data from various data sources. For example, the data sources include websites, articles, posts on the web, and the like. From this massive amount of data coupled with the computing power of LLMs, the LLM is able to perform various inference tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like. The LLM is configured to receive a prompt and generate a response to the prompt. The prompt may include a task request and additional contextual information that is useful for responding to the query. The LLM infers the response to the query from the knowledge that the LLM was trained on and/or from the contextual information included in the prompt.

In one or more embodiments, the inference task for the model serving system 150 can primarily be based on reasoning and summarization of knowledge specific to the online system 140, rather than relying on general knowledge encoded in the weights of the machine-learned model of the model serving system 150. Thus, one type of inference task may be to perform various types of queries on large amounts of data in an external corpus in conjunction with the machine-learned model of the model serving system 150. For example, the inference task may be to perform question-answering, text summarization, text generation, and the like based on information contained in the external corpus.

Thus, in one or more embodiments, the online system 140 is connected to an interface system 160. The interface system 160 receives an external corpus of data from the online system 140 and builds a structured index over the data using another machine-learned language model or heuristics. The interface system 160 receives one or more task requests from the online system 140 based on the external data. The interface system 160 constructs one or more prompts for input to the model serving system 150. A prompt may include the task request of the user and context obtained from the structured index of the external data. In one instance, the context in the prompt includes portions of the structured indices as contextual information for the query. The interface system 160 obtains one or more responses to the query from the model serving system 150 and synthesizes a response. While the online system 140 can generate a prompt using the external data as context, oftentimes, the amount of information in the external data exceeds prompt size limitations configured by the machine-learned language model. The interface system 160 can resolve prompt size limitations by generating a structured index of the data and offers data connectors to external data and provides a flexible connector to the external corpus.

In one or more embodiments, the online system 140 performs an inference task in conjunction with the model serving system 150 and/or interface system 160 to generate images that represent query suggestions shown to users, to provide users with a contextualized online shopping experience.

Specifically, in e-commerce websites or applications, users can search for products by typing in the product name (e.g., search query) into a search bar on an interface. Search systems may enhance a user's experience through query auto-completions and query suggestions. In the case of query auto-completion, the search system generates and displays query suggestions as a user enters the first few characters of the search query into the search bar. In some embodiments, the search interface generates and displays query suggestions to users before any characters are entered into the search bar. To display the query suggestions to the user, the search bar may extend to display a drop-down list of query suggestions, and a product image is displayed in association to each query suggestion.

In one or more embodiments, some e-commerce search systems often display the image of the first item or most purchased item related to the query suggestion. However, these images may not accurately represent the query suggestions. For example, the images may not accurately represent the broad concept of the query or the collection of queries. Specifically, while displaying an image of eggs in association with a query suggestion "breakfast" can be acceptable, a more accurate representation of the query suggestion would be an image of a collection of breakfast items, such as milk, eggs, cereal, bread, etc. Further, the images may lack appeal to the user and fail to encourage user engagement. Hence, showing marketing images of the products may attract more attention and increase product sales.

To address these challenges, the online system 140 uses a text-to-image model to generate images for query suggestions, and uses a ranking model to identify an image that most accurately represents the query suggestion. Specifically, the online system 140 generates a corpus of query suggestions using search query log mining methods. In some embodiments, the online system 140 generates the corpus using user engagement data. For example, the corpus may include most frequently searched search queries, or query suggestions with the highest conversion rates.

For each of the query suggestions in the corpus, the online system 140 retrieves one or more images of the items associated with the query suggestion from the product catalog. In addition, the online system 140 generates one or more images associated with the query suggestion using a text-to-image model. The online system 140 constructs a prompt including the query suggestion, a task request to the text-to-image model to generate one or more images based on the query suggestion, and other relevant contextual information. The online system 140 stores the images from the product catalog and the images generated by the text-to-image model in the data store 240 in association with the query suggestion.

The online system 140 performs a ranking of the images associated with the query suggestion to determine the image to show to a user. In one or more embodiments, the online system 140 may perform the ranking based on store data, temporal data (e.g., seasonality), user activity and engagement data. In one or more embodiments, the online system 140 displays the highest ranked image to the user in association with the query suggestion.

In this manner, the online system 140 identifies an image that most accurately depicts the query suggestion and that is relevant to the user to optimize desired user engagement in an e-commerce environment.

In one or more embodiments, the online system 140 also performs an inference task in conjunction with the model serving system 150 and/or interface system 160 perform query auto-completion and generate query suggestions to provide the users with a personalized and contextualized online shopping experience.

As described above, users can search for products by typing in the name of the product into a search bar on the ordering interface. However, classic query auto-completion and suggestion systems often include several steps, for example, query log mining for query candidate generation, prefix matching for query retrieval in auto-completion or user historical searches when generating query suggestions, and ranking the retrieved queries for display to a user. Also, classic query auto-completion and suggestion systems may also face a cold-start challenge due to the lack of user engagement data to generate query suggestions personalized to users.

To simplify the system and successfully address the cold-start challenge, the online system 140 employs an end-to-end (E2E) generative query auto-completion and query suggestion system that uses an LLM. Specifically, the online system 140 uses a pre-trained LLM to perform zero-shot generative query auto-completion and suggestion. The online system 140 accesses data of a user and a store, which may be stored in the data store 240, and constructs a prompt including the data of the user and the store, a task request to the LLM to generate a set of query suggestions that are relevant to the user based on the data of the user and the store, and other relevant contextual information. The data of the user may include historical queries previously made by the user, one or more products previously purchased by the user, a persona of the user, and one or more items in a cart of the user.

However, since a pre-trained LLM may not be optimized on user conversion rates, the set of query suggestions generated by the LLM may not yield optimal click-through rates or cart-add rates in an e-commerce environment. Thus, in one or more embodiments, the online system 140 employs supervised fine-tuning to improve the performance of the pre-trained LLM for an e-commerce objective. The online system 140 may collect positive user engagement data over a duration of time as training data for the LLM. The positive user engagement data may include a user's purchasing history and suggested queries that users have previously interacted with. The online system 140 may determine query engagement patterns from the collected user engagement data. The online system 140 may also use the user engagement data to fine-tune the pre-trained LLM. The online system 140 may further fine-tune the LLM using a Reinforcement Learning from Human Feedback (RLHF) system, which optimizes the LLM using user engagement data.

In addition, performing query auto-completion and suggestion is latency sensitive, and the LLM may exceed the latency budget. Thus, in some embodiments, the online system 140 may employ offline caching and model distillation methods to optimize latency. These methods are discussed in further detail in relation to FIG. 2.

In this manner, the E2E platform employed by the online system 140 is simplified compared to classic query auto-completion and suggestion systems, and generates a list of query suggestions that are more relevant to the user to optimize user engagement in an e-commerce environment.

In one or more embodiments, the online system 140 also performs an inference task in conjunction with the model serving system 150 and/or interface system 160 to perform query auto-completion and query suggestion to help customers better navigate their shopping experience and inspire new ideas by generating and displaying natural language (NL) queries to users.

As described above, users can search for items by typing in the name of the item into a search bar on the ordering interface. However, classic query auto-completion and suggestion systems for processing standard term queries, such as milk, eggs, etc., are ineffective at suggesting natural language (NL) based queries. Some examples of NL queries include "help me plan a meal for the next week", or "what are the best snacks for kids?" As users of the online system 140 still rely on term queries, the online system 140 may face a cold-start challenge.

To address the cold-start challenge, first, the online system 140 generates a corpus of NL query candidates that can be recommended to users in conjunction with an LLM. The online system 140 accesses a collection of popular term queries that may be stored in the data store 240. The online system 140 constructs a prompt including the popular term queries, a suggestion type, a task request to the LLM to generate a corpus of NL queries, and other relevant contextual information. The suggestion types may guide the LLM in generating NL queries across different categories. Some examples of suggestion types may include contextual ideas, ingredients, complementary items, food variety, etc. The online system 140 may store the corpus of NL queries in a data store.

The online system 140 may employ search query log mining methods as users adopt to using NL query suggestions. The search query log mining methods may include frequency mining and/or generative NL query mining. These methods are discussed in further detail in relation to FIG. 6.

Second, the online system 140 performs context-based retrieval for NL queries. The online system 140 generates the query suggestions by retrieving a set of NL queries from the data store. For query auto-completion, the online system 140 may retrieve NL queries that match a prefix of an NL query entered by the customer. In other embodiments, the online system 140 may employ an anchor query-based retrieval method. The online system 140 may retrieve the NL queries based on a user's previous searches, previous item purchases, items in the user's cart, or seasonality using the anchor queries. The online system 140 retrieves an N number of NL queries using the methods described above.

Third, the online system 140 performs a ranking of the N number of retrieved NL queries based on the user's past activity to determine the NL queries that are most relevant to the user. The online system 140 identifies an M number of top-ranked NL queries to display to the customer.

In this manner, the online system 140 generates one or more suggested NL queries and displays the NL queries to the user. This allows the online system 140 to improve the efficiency of performing a search, introduce the users to new ideas and products, and potentially increase the user's basket size.

Figure 1B:
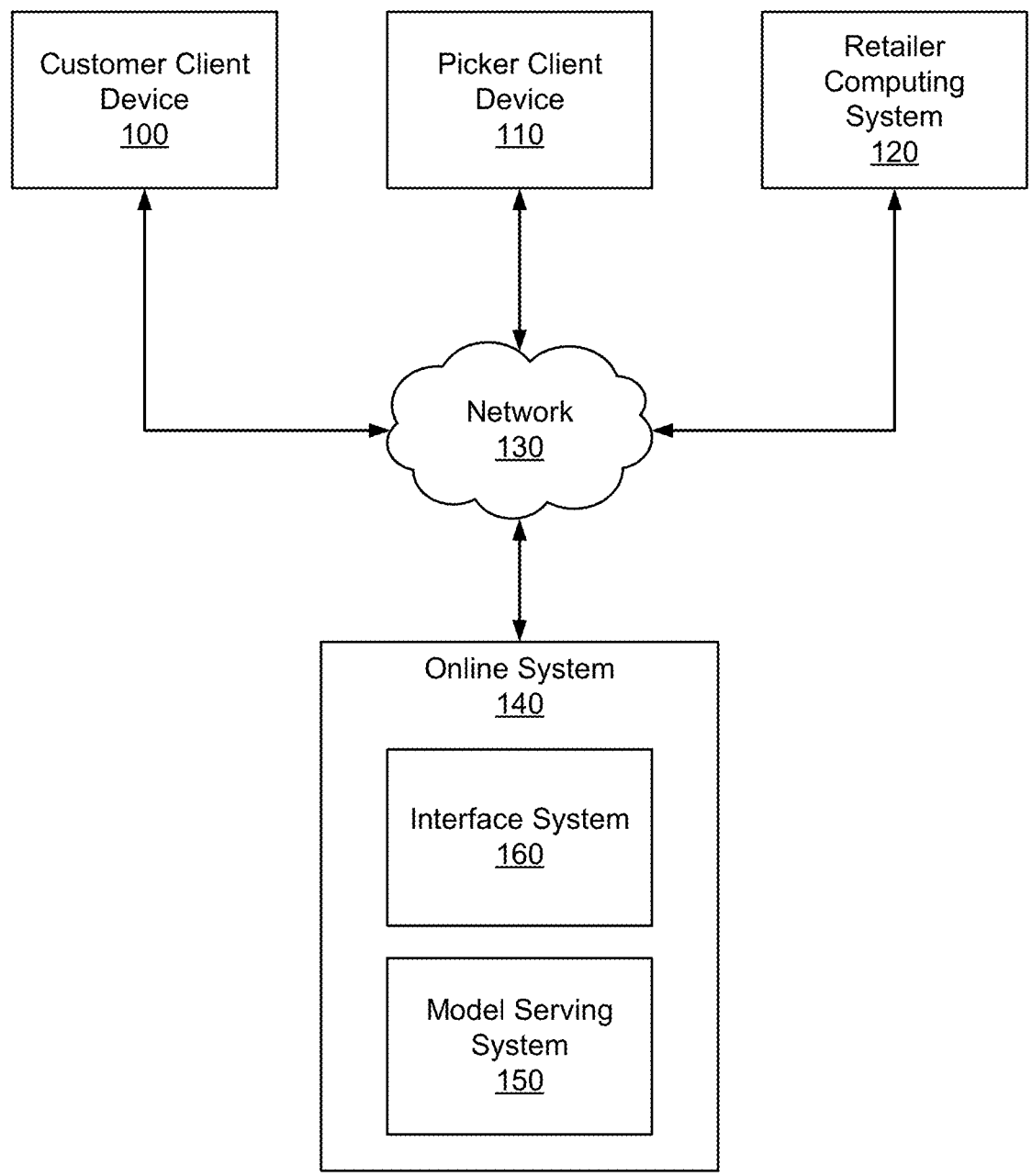
FIG. 1B illustrates an example system environment for an online system, in accordance with one or more embodiments.

FIG. 1B illustrates an example system environment for an online system 140, in accordance with one or more embodiments. The system environment illustrated in FIG. 1B includes a customer client device 100, a picker client device 110, a retailer computing system 120, a network 130, and an online system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 are each managed by an entity separate from the entity managing the online system 140. In one or more embodiments, as illustrated in the example system environment in FIG. 1B, the model serving system 150 or the interface system 160 is managed and deployed by the entity managing the online system 140.

Figure 2:
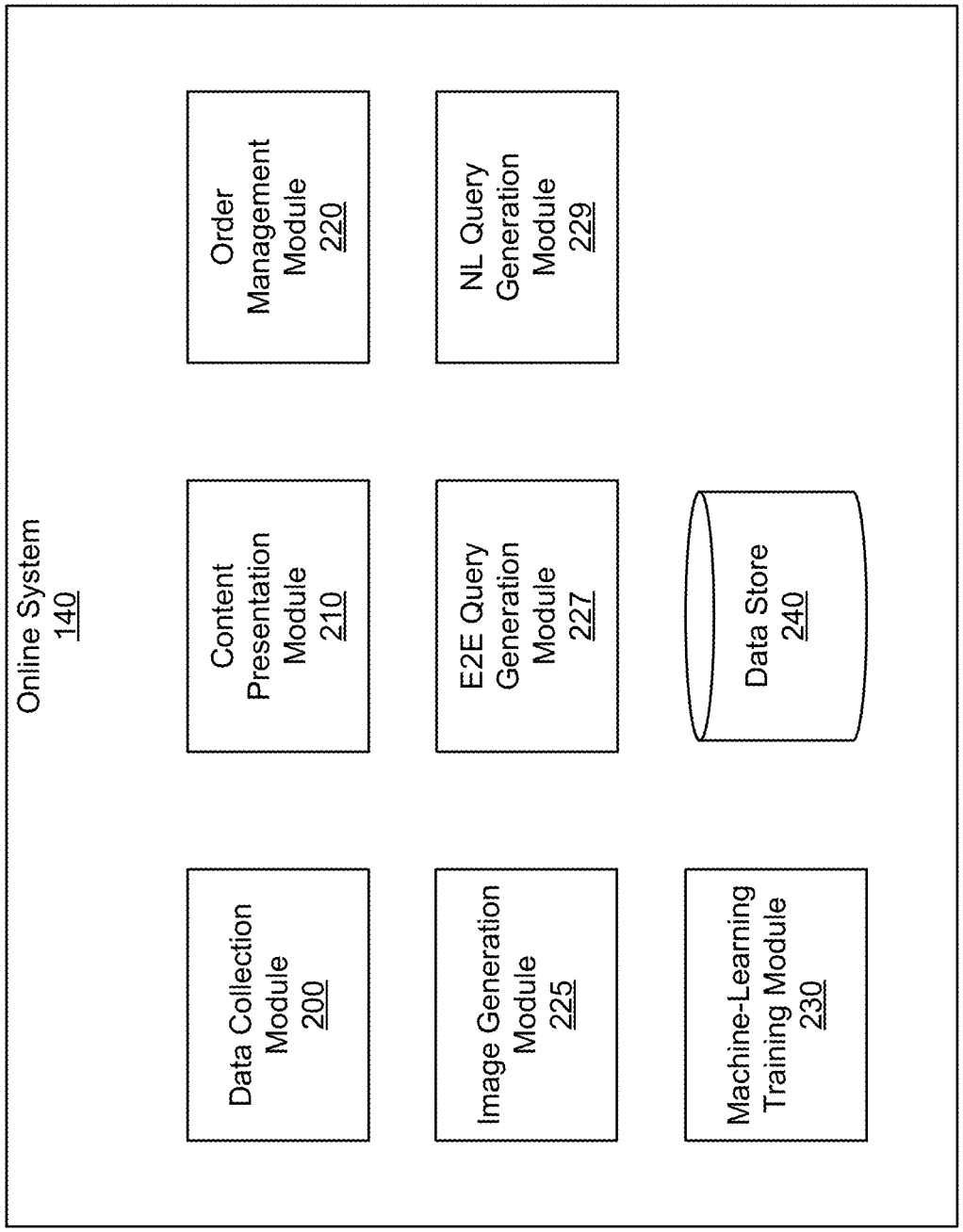
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, an image generation module 225, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has services orders for the online system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

In one or more embodiments, the data collection module 200 also collects communication data, which is different types of communication between shoppers and users of the online system 140. For example, the data collection module 200 may obtain text-based, audio-call, video-call based communications between different shoppers and users of the online system 140 as orders are submitted and fulfilled. The data collection module 200 may store the communication information by individual user, individual shopper, per geographical region, per subset of users having similar attributes, and the like.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In one or more embodiments, the content presentation module 210 scores items based on a search query received from the customer client device 100. A search query may be free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In one or more embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

In one or more embodiments, the content presentation module 210 receives one or more recommendations for presentation to the customer while the customer is engaged with the ordering interface. The list of ordered items of a customer may be referred to as a basket. As described in conjunction with FIGS. 1A and 1B, the recommendations are generated based on the inferred purpose of the basket of the customer and include one or more suggestions to the customer to better fulfill the purpose of the basket.

In some instances, the recommendations are in the form of one or more equivalent baskets that are modifications to an existing basket that serve the same or similar purpose as the original basket. The equivalent basket is adjusted with respect to metrics such as cost, healthiness, whether the basket is sponsored, and the like. For example, an equivalent basket may be a healthier option compared to the existing basket, a less expensive option compared to the existing basket, and the like. The content presentation module 210 may present the equivalent basket to the customer via the ordering interface with an indicator that states how an equivalent basket improves or is different from the existing basket (e.g., more cost-effective, healthier, sponsored by a certain organization). The content presentation module 210 may allow the customer to swap the existing basket with an equivalent basket.

In some instances, when the basket includes a list of edible ingredients, the recommendations are in the form of a list of potential recipes the ingredients can fulfill, and a list of additional ingredients to fulfill each recipe. The content presentation module 210 may present each suggested recipe and the list of additional ingredients for fulfilling the recipe to the customer. The content presentation module 210 may allow the customer to automatically place one or more additional ingredients in the basket of the customer.

The order management module 220 that manages orders for items from customers. The order management module 220 receives orders from a customer client device 100 and offers the orders to pickers for service based on picker data. For example, the order management module 220 offers an order to a picker based on the picker's location and the location of the retailer from which the ordered items are to be collected. The order management module 220 may also offer an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to offer an order to a picker based on a delivery timeframe requested by the customer with the order. The order management module 220 computes an estimated amount of time that it would take for a picker to collect the items for an order and deliver the ordered item to the delivery location for the order. The order management module 220 offers the order to a picker at a time such that, if the picker immediately services the order, the picker is likely to deliver the order at a time within the timeframe. Thus, when the order management module 220 receives an order, the order management module 220 may delay in offering the order to a picker if the timeframe is far enough in the future.

When the order management module 220 offers an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all or a set of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

1. Query Image Generation using Artificial Intelligence (AI)

The image generation module 225 generates and displays query images that accurately depict query suggestions to a user. The image generation module 225 may also use retailer data, temporal data, and user data to generate product images that are more relevant to the user.

As described above, the image generation module 225 generates a corpus of query suggestions using search query log mining. For example, the image generation module 225 may access the search query log of different users to construct the corpus of query suggestions with the top N number of most frequently searched search queries or query suggestions with the highest resulting conversion rates.

For each of the query suggestions in the corpus database, the image generation module 225 generates a collection of candidate images depicting a query suggestion, the collection of candidate images including catalog images and images generated by an AI text-to-image model. In some embodiments, the image generation module 225 generates the collection of candidate images for each query suggestion in an offline process. The image generation module 225 accesses catalog images of the items available for order on the online system 140 and retrieves one or more item images associated to the query suggestion. In addition, the image generation module 225 uses a text-to-image model to generate one or more images depicting the query suggestion. Together, the item images and images from the AI model make up a set of candidate query images for the query suggestion.

To obtain the images from the AI model, the image generation module 225 constructs a prompt and a task request to the text-to-image model to generate the one or more images depicting the query suggestion. An example prompt to the text-to-image model of the model serving system 150 may be:

"Please generate a thumbnail image for query [Query Suggestion] for a website."

The prompt may also include a set of contextual features described below. The image generation module 225 receives the generated images from the text-to-image model and stores the generated images in the data store 240 in association with the query suggestion.

When a user interacts with the search bar, the ordering interface displays one or more query suggestions alongside their corresponding query images to the user. The image generation module 225 tracks user engagement actions in response to the displayed query suggestions and query images. The image generation module 225 may store positive user engagement data in the data store 240. The user engagement data includes metrics such as a click-through rate (CTR) which is a ratio of clicks to impressions, indicating when a user clicks on a query suggestion and image combination, and/or a conversion rate (CVR) which is a ratio of conversions to interactions, indicating when a user adds a product to their shopping cart after interacting with a query suggestion and image combination. The stored user engagement data may further include the query suggestions associated with user clicks and conversions.

The image generation module 225 performs a ranking of the candidate query images in the collection of candidate images to determine the image to display in association with the query suggestion for a particular user during a search session. In one or more embodiments, the image generation module 225 may train the ranking model in a supervised manner, using labeled training data including query images and corresponding user engagement data. The image generation module 225 obtains a set of training examples, where a training example includes an image associated with a previous query suggestion, a training set of contextual features, and engagement data for the previous query suggestion and the query image pair. The image generation module 225 trains parameters of the ranking model using the set of training examples. Specifically, the loss function is computed to represent a difference between the engagement data for the training examples and estimated outputs generated by applying the ranking model to the query images and the contextual features in the training examples.

In one or more embodiments, the image generation module 225 may perform the ranking of the collection of candidate images by applying the trained ranking model to the set of contextual features including retailer data, temporal data (e.g., seasonality data), and user data (e.g., search history and purchase history) associated with the user or query suggestion to generate a set of scores for the respective set of images for the query suggestion. The query images are ranked according to the scores and the image generation module 225 selects an image for display to the user in association with the query suggestion.

In one or more embodiments, the image generation module 225 may fine-tune parameters of the AI text-to-image model using a reinforcement learning from human feedback (RLHF) system. The RLHF system includes a RLHF reward model, which may be trained on query suggestion candidates, query images for those query suggestions, and user engagement data, such as CTR and CVR, to determine the query suggestion and image pairs that drive high user engagement. The reward model may generate reward signals (e.g., scalar rewards) which are incorporated into a reward function. For example, the reward model may be trained to receive an image for a query suggestion and the contextual features, and generate a reward indicating how likely a given user will convert on the image and query suggestion combination. In another example, the reward model may generate how likely a user will click on the query suggestion if presented to the user with the corresponding image.

The parameters of the text-to-image model may be fine-tuned with reinforcement learning with respect to the reward function. In one or more embodiments, the image generation module 225 generates a training prompt specifying a request to generate an image for a query suggestion. The image generation module 225 applies a base model to the training prompt to generate a base query image. The base model may be a version or copy of the text-to-image model with a frozen set of parameters. The image generation module 225 applies the text-to-image model to the training prompt to generate an estimated query image. The image generation module 225 generates a reward for at least the estimated query image by applying the trained reward model to the training prompt and the estimated query image. The image generation module 225 computes a loss function including a first loss indicating a difference between the estimated query image and the base query image, and a second loss proportional to the reward for the estimated query image as determined by the machine-learning reward model. The image generation module 225 backpropagates terms from the loss function to update the parameters of the text-to-image model.

The reward model may be retrained using new user engagement data, and reinforcement learning is used to continue to fine-tune the model. In this manner, the AI text-to-image model may generate images over time that are associated with high interaction and conversion likelihoods with users of the online system 140 for a given query suggestion.

Figure 3:
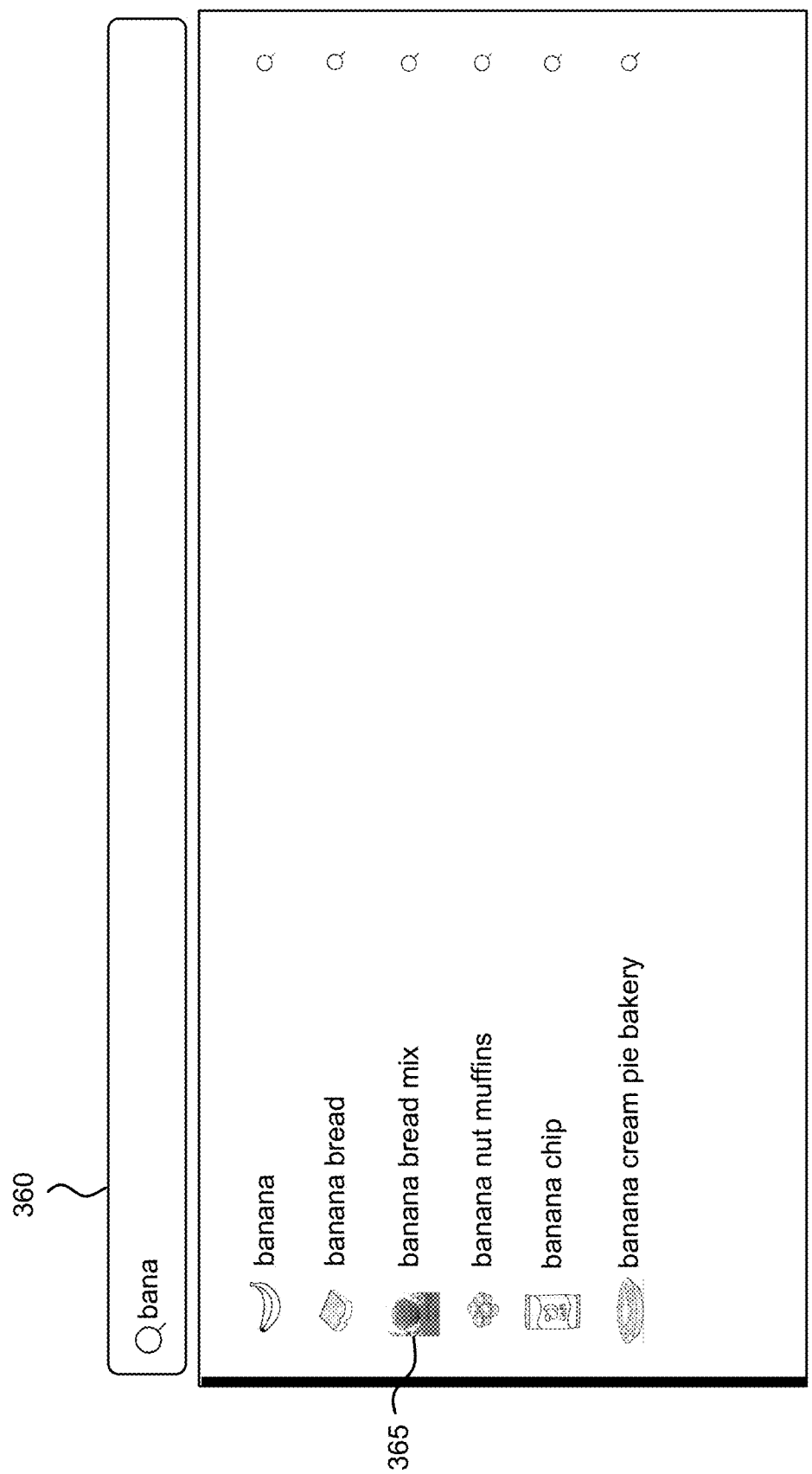
FIG. 3 illustrates an example search interface which displays query suggestions and corresponding generated images, in accordance with one or more embodiments.

FIG. 3 illustrates an example search interface that displays query suggestions and corresponding generated images, in accordance with one or more embodiments. As described in FIG. 2, the ordering interface includes a search bar 360 that displays one or more query suggestions alongside their corresponding product images when a user interacts with the search bar. As illustrated by FIG. 3, a user enters a prefix 'bana' into the search bar, which displays a list of relevant query suggestions and the corresponding product images. In one or more embodiments, the query images are generated by a text-to-image model according to the process described in FIG. 2 in conjunction with the image generation module 225. For example, for query suggestion banana nut muffins, the image generation module 225 obtains the set of images for the query suggestion from a data store 240, and generates a score for each image using the ranking model based on contextual features related to the user. The image 365 may be selected since the image has the highest score, and displayed alongside the query suggestion to the user.

2. End-to-End (E2E) Query Suggestion Generation using AI

Returning to FIG. 2, the E2E query generation module 227 generates and displays one or more most relevant query suggestions to a user. As described above, compared to classic query auto-completion and suggestion systems, the E2E query auto-completion and suggestion system has a less complex system architecture, provides results that are more relevant to users, and successfully addresses the cold start challenge in search systems.

To address the cold-start challenge, the E2E query generation module 227 uses a pre-trained LLM to perform zero-shot generative query auto-completion and suggestions. For query suggestions, the E2E query generation module 227 encodes a set of contextual features such as retailer data, seasonal data, user data (e.g., search history and purchase history), and items in the user's cart into a prompt provided to the LLM. The prompt further includes a request to the LLM to generate a set of query suggestions relevant to the user given the set of contextual features. An example prompt to the LLM of the model serving system 150 may be:

"For store <retailer>, a user of persona <persona>, past orders of <items>, items in cart, provide a list of queries you would suggest to the user."

Examples of user personas may include "busy parents" or "single male with no dietary concerns."

For query auto-completion, the E2E query generation module 227 constructs a prompt including the user-provided prefix and a task request to the LLM to generate a set of query suggestions relevant to the user and that include the user-provided prefix. An example prompt to the LLM of the model serving system 150 may be:

"For store <retailer>, a user of persona <persona>, past orders of <items>, items in cart, provide a list of queries you would suggest to the user with the prefix 'sna'."

The E2E query generation module 227 receives a set of query suggestions from the LLM. In some embodiments, the E2E query generation module 227 applies post-processing methods, such as impression discounting and semantic deduplication, to the response from the LLM prior to displaying the suggestions to the user. Responsive to an opportunity to present query suggestions to a user on the search interface, the E2E query generation module 227 displays at least the list of query suggestions to the user.

As described in conjunction with FIG. 1A, the E2E query generation module 227 stores positive user engagement data over a duration of time. The user engagement data includes metrics such as a click-through rate (CTR) which is a ratio of clicks to impressions, indicating when a user clicks on a query suggestion, and/or a conversion rate (CVR) which is a ratio of conversions to interactions, indicating when a user adds a product to their shopping cart after interacting with a query suggestion. The user engagement data may further include the suggested queries associated with user clicks and conversions. The E2E query generation module 227 may store the user engagement data in the data store 240.

The E2E query generation module 227 employs a supervised fine-tuning technique to enhance the relevance of the query suggestions generated by the LLM. The E2E query generation module 227 may perform the fine-tuning by training the LLM on the collected user engagement data. As an example, a first user shopping at a first grocery store may have previously purchased lactose-free milk, and engaged with query suggestions such as lactose-free ice cream and lactose-free snacks. In this example, the LLM may generate query suggestions including lactose-free products to the user. In another example, a second user may have previously purchased keto snacks, and engaged with a query suggestion such as keto ideas. In such an example, the LLM may generate query suggestions including keto products to the user. In this manner, the LLM is adapted to suggest queries that are likely to result in user engagement.

The E2E query generation module 227 may also fine-tune the LLM using a RLHF system. The RLHF system includes a reward model, which may be trained on query suggestion candidates and customer engagement data, such as CTR and CVR, to determine the query suggestion candidates that drive high user engagement. The reward model may generate reward signals (e.g., scalar rewards) which are incorporated into a reward function. For example, the reward model may be trained to receive a query suggestion and the contextual features, and generate a reward indicating how likely the user will convert on the query suggestion.

The set of parameters of the LLM may be fine-tuned with reinforcement learning with respect to the reward function. In one or more embodiments, the E2E query generation module 227 generates a training prompt specifying a request to generate one or more query suggestions given a set of contextual features. The E2E query generation module 227 applies a base model to the training prompt to generate one or more base query suggestions. The base model may be a version of the LLM with a frozen set of parameters. The E2E query generation module 227 applies the LLM to the training prompt to generate one or more estimated query suggestions. The E2E query generation module 227 generates a reward for at least the estimated query suggestions by applying the trained reward model to the training prompt and the estimated query suggestions. The E2E query generation module 227 computes a loss function including at least a first loss indicating a difference between the estimated query suggestions and the base query suggestions, and a second loss proportional to the reward. The E2E query generation module 227 backpropagates terms from the loss function to update the parameters of the LLM.

The reward model may be retrained using new user engagement data, and reinforcement learning is used to continue to fine-tune the model. In this manner, the LLM may generate queries suggestions over time that are associated with high interaction likelihoods and conversion likelihoods with users of the online system 140.

In some embodiments, the E2E query generation module 227 may additionally employ offline caching and model distillation methods for optimizing latency. For offline caching, the E2E query generation module 227 generates query suggestions offline based on retailer data, past queries submitted by users and purchased items (e.g., top queries or products), user persona and prefixes offline. For example, a list of query suggestions may be generated for a user based on these contextual features, and stored in association with the user. During online serving, the query suggestions are retrieved based on keys using key-value lookup. A key may be unique identifiers associated with a query suggestion. For example, the key may be a hash of user data or a prefix submitted by a user, and the retrieved value may be one or more query suggestions to present to the user.

For model distillation, the E2E query generation module 227 generates query suggestions using a teacher LLM, and fine-tunes a smaller LLM using the generated data. The smaller LLM may perform inference at a faster rate, which is beneficial for query auto-completion and suggestion. In this manner, the E2E query generation module 227 may reduce latency of the system and ensure responsive interactions with the users.

3. Generating Natural Language Based Query Suggestions using AI

The NL query generation module 229 generates and displays one or more relevant NL query suggestions to a user. Compared to conventional search queries, NL-based queries may be different in that the queries are of a narrative form and include a higher degree of context that is typically not present in traditional search queries that are often singular terms. A first component of the process is that the NL query generation module 229 generates a corpus of NL-based queries based on popular term queries and historical user term queries. An LLM can be used to generate the corpus of NL queries to address the cold-start problem. The NL query generation module 229 constructs a prompt and a task request to the LLM to generate a corpus of NL queries. An example prompt to the LLM of the model serving system 150 may be:

"Please generate interesting natural language suggestions for [Anchor query] of [Suggestion Type]."

In the example above, the anchor query (e.g., a reference query) is a popular term query. In some embodiments, frequently searched term queries are collected and stored in the data store 240 by the data collection module 200. The suggestion type may guide the LLM in generating different types of NL queries across various categories. Some examples of suggestion types may include contextual ideas, ingredients, substitute, complementary, food variety, and general extension to broader intent queries, and the like. Accordingly, the generated NL queries may be an extension of the anchor query with certain attributes or related to specific occasions common to the anchor query. As an example, given an anchor query of "breakfast" and a suggestion type of "contextual ideas," the LLM may generate an NL query "healthy breakfast ideas" or "gluten-free breakfast ideas." For another example, given an anchor query of "chips" and a suggestion type of "complementary," the LLM may output an NL query "dips for chips." Another example includes an anchor query of "milk" and a suggestion type of "broader intent," to which the LLM may generate an NL query "breakfast essentials." The NL query generation module 229 may store the generated NL queries in the data store 240.

As described above, a second component of the NL query generation module 229 performs query auto-completion and generation of query suggestions by retrieving the identified NL-based queries. In one or more embodiments, the NL query generation module 229 performs query auto-completion by employing a substring matching method or an anchor query-based retrieval method. As described in conjunction with FIG. 1A, the NL query generation module 229 performs substring matching by retrieving NL queries that match the user entered prefix. The NL query generation module 229 may retrieve an N number of candidate NL queries.

In one or more embodiments, the NL query generation module 229 performs an anchor query-based retrieval by mapping the user entered prefix with anchor queries, the anchor queries being product queries, and mapping the anchor queries to NL queries, to retrieve NL queries that do not necessarily include the prefix. For example, if a user enters the prefix "mi-", the NL query generation module 229 matches the prefix with the anchor query "milk" then retrieves the NL query "breakfast essentials" using the anchor query. In some embodiments, the prefix, anchor queries, and NL queries stored in the data store 240 are converted to embedding vectors. The NL query generation module 229 may use the embedding vector of the prefix to find a matching anchor query. The NL query generation module 229 may compare the embedding vector of the anchor query to the embedding vectors of the NL queries. This allows the NL query generation module 229 to identify the NL queries that may not contain the prefix, but are semantically or contextually similar to the anchor query. For example, the embedding for "milk" is close to the embedding for "breakfast essentials."

For query suggestions with no predetermined prefix, the NL query generation module 229 suggests queries based on a user's past activity or seasonality. The NL query generation module 229 may access the data store 240 for user data, and identify a user's most frequently searched queries, previous item purchases, items in the user's cart, or seasonality using the anchor queries. For example, if a user has "flour" in their shopping cart, the NL query generation module 229 may retrieve NL queries related to using "flour" as an ingredient, such as "carrot cake ingredients." In another example, the NL query generation module 229 may determine that Halloween is coming up soon based on popular anchor queries. The NL query generation module 229 may retrieve NL queries related to Halloween, such as "Halloween party decorations." In one or more embodiments, user embeddings can be trained for users and NL query embeddings can be trained for NL queries, and embedding-based retrieval is performed to retrieve a set of NL queries for a user. The NL query generation module 229 retrieves an N number of relevant NL queries.

A third component is that the NL query generation module 229, for a user, ranks the identified subset of NL queries to present to the user. The NL query generation module 229 ranks the N number of retrieved NL queries and displays a subset of M number of NL queries that are determined to be the most relevant to the customer. The NL query generation module 229 may use random sampling methods, or use the user engagement data collected for term (e.g., product) queries to rank the retrieved NL queries.

The NL query generation module 229 may rank the retrieved NL queries using a machine-learning recommendation model trained on collected user engagement data. The NL query generation module 229 displays suggested NL queries to the user and tracks the user's engagement actions in response to the displayed NL queries. The recommendation model may be trained on a set of contextual features including user data, engagement data, the retrieved NL queries to learn the user' preferences from past user interactions and identify features that drive positive user engagement. The recommendation model generates a ranking of the NL queries, where the top-ranked NL query represents the most relevant NL query to the customer. The NL query generation module 229 may display an M number of top-ranked NL queries to the customer.

As users start to adopt using NL queries, the data collection module 200 collects customer engagement data. For example, in collecting the customer engagement data the data collection module 200 may collect metrics such as a click-through rate (CTR) which is a ratio of clicks to impressions, indicating when a customer clicks on a suggested NL query, and/or a conversion rate (CVR) which is a ratio of conversions to interactions, indicating when a customer adds a product to their shopping cart after interacting with a suggested NL query.

The NL query generation module 229 may use the engagement data to perform search query log mining to improve the performance of the LLM. NL queries may start to populate user search query logs as users increase their usage of NL queries. The data collection module 200 may store the search query log of each customer in the data store 240. The NL query generation module 229 may access the stored search query log of each user to identify a user's most frequently searched NL queries, which may be used to fine-tune the LLM to generate NL queries that are personalized to the user as described above with respect to the first component.

In one or more embodiments, the NL query generation module 229 may perform generative NL query mining, which involves fine-tuning the LLM using reinforcement learning from human feedback (RLHF). The RLHF reward model may be trained on the NL query candidates and user engagement data, such as CTR and CVR, to determine the NL query candidates that drive high user engagement. The reward model may generate reward signals (e.g., scalar rewards) which are incorporated into a reward function. For example, the reward model may be trained to receive a NL query (e.g., for an anchor query) and the contextual features, and generate a reward indicating how likely a user will convert on the NL query.

The set of parameters of the LLM may be fine-tuned with reinforcement learning with respect to the reward function. In one or more embodiments, the NL query generation module 229 generates a training prompt specifying a request to generate one or more natural language query suggestions given a term query. The NL query generation module 229 applies a base model to the training prompt to generate one or more base NL query suggestions. The base model may be a version of the LLM with a frozen set of parameters. The NL query generation module 229 applies the LLM to the training prompt to generate one or more estimated NL query suggestions. The NL query generation module 229 generates a reward for at least the estimated NL query suggestions by applying the trained reward model to the training prompt and the estimated NL query suggestions. The NL query generation module 229 computes a loss function including a first loss indicating a difference between the estimated NL query suggestions and the base NL query suggestions, and a second loss proportional to the reward. The NL query generation module 229 backpropagates terms from the loss function to update the parameters of the LLM.

The reward model may be retrained using new customer engagement data, and reinforcement learning is used to continue to fine-tune the model. In this manner, the LLM may generate NL queries over time that are associated with high interaction likelihoods and conversion likelihoods with users of the online system 140.

The machine learning training module 230 trains machine learning models used by the online system 140. For example, the machine learning module 230 may train the item selection model, the availability model, or any of the machine-learned models deployed by the model serving system 150. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, and picker data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online system 140. In another embodiment, when the model serving system 150 is included in the online system 140, the machine-learning training module 230 may further train parameters of the machine-learned model based on data specific to the online system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

Figure 4:
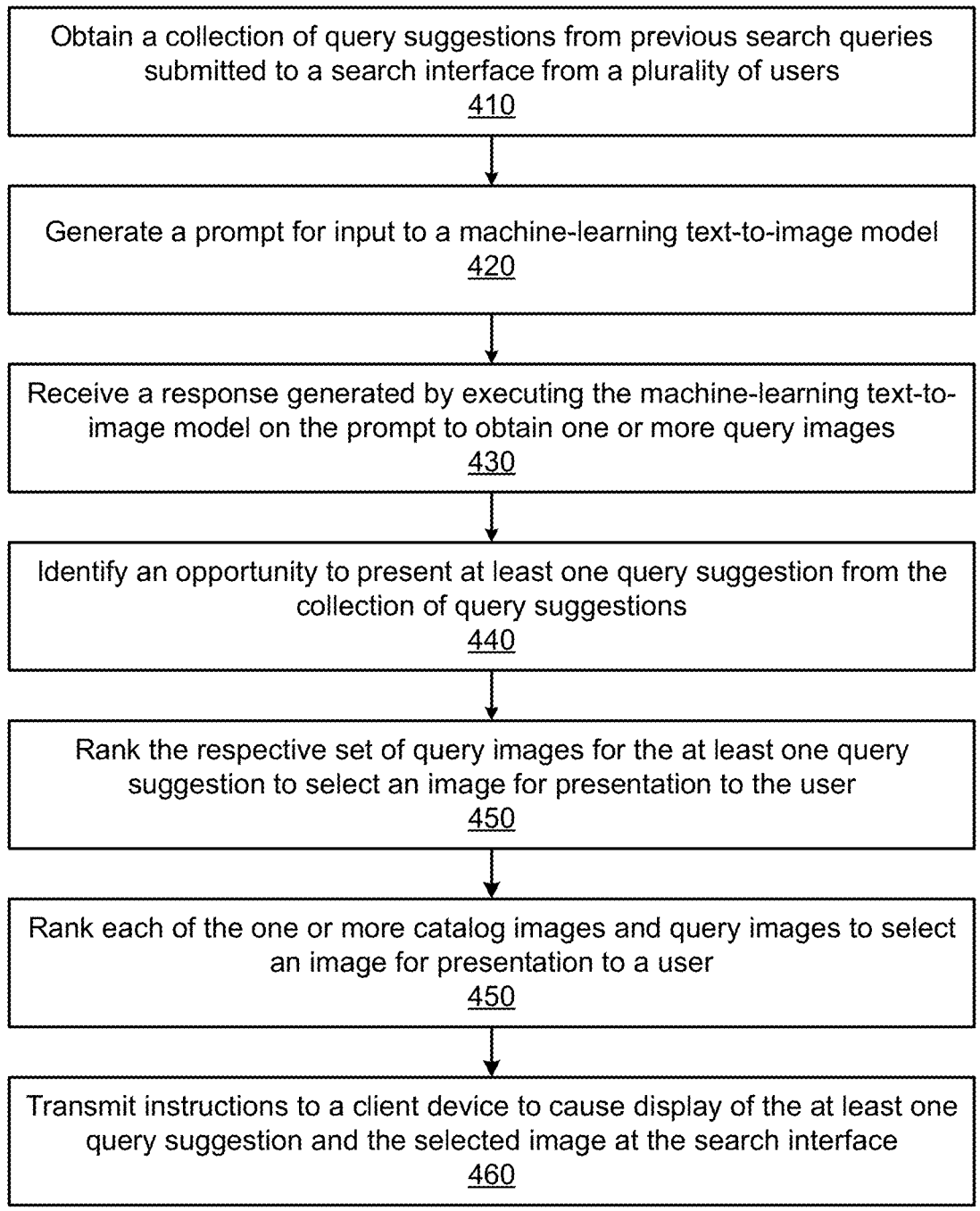
FIG. 4 is a flowchart for a method for generating an image that represents a query suggestion for a user, in accordance with one or more embodiments.

FIG. 4 is a flowchart for a method for generating an image that best represents a query suggestion, in accordance with one or more embodiments. Alternative embodiments may include more, fewer, or different steps from those illustrated in FIG. 4, and the steps may be performed in a different order from that illustrated in FIG. 4. These steps may be performed by an online system (e.g., online system 140). Additionally, each of these steps may be performed automatically by the online system without human intervention.

The online system obtains 410 a collection of query suggestions from previous search queries submitted to a search interface of an online system from a plurality of users. For each query suggestion of the collection of query suggestions, the online system generates 420 a prompt for input to a machine-learning text-to-image model, the prompt specifying at least the query suggestion, and a request to generate one or more query images based on the query suggestion.

The online system receives 430, from the model serving system, a response generated by executing the machine-learning text-to-image model on the prompt to obtain the one or more query images. The online system 140 obtains a set of query images for the query suggestion, the set of query images including at least the one or more query images obtained from the machine-learning text-to-image model.

The online system 140 identifies 440, for a user, an opportunity to present at least one query suggestion from the collection of query suggestions. The online system 140 ranks 450 the respective set of query images for the at least one query suggestion to select an image for presentation to a user. The online system 140 transmits 460 instructions to a client device to cause display of the at least one query suggestion and the selected image at a search interface. In one or more embodiments, user feedback may be received that can be used to fine-tune the parameters of the models. For example, a user clicking on a query with a generated image and that might be a positive indication that the generated image is a good image for the query. These positive indications can be collected and used to fine-tune the model.

Figure 5:
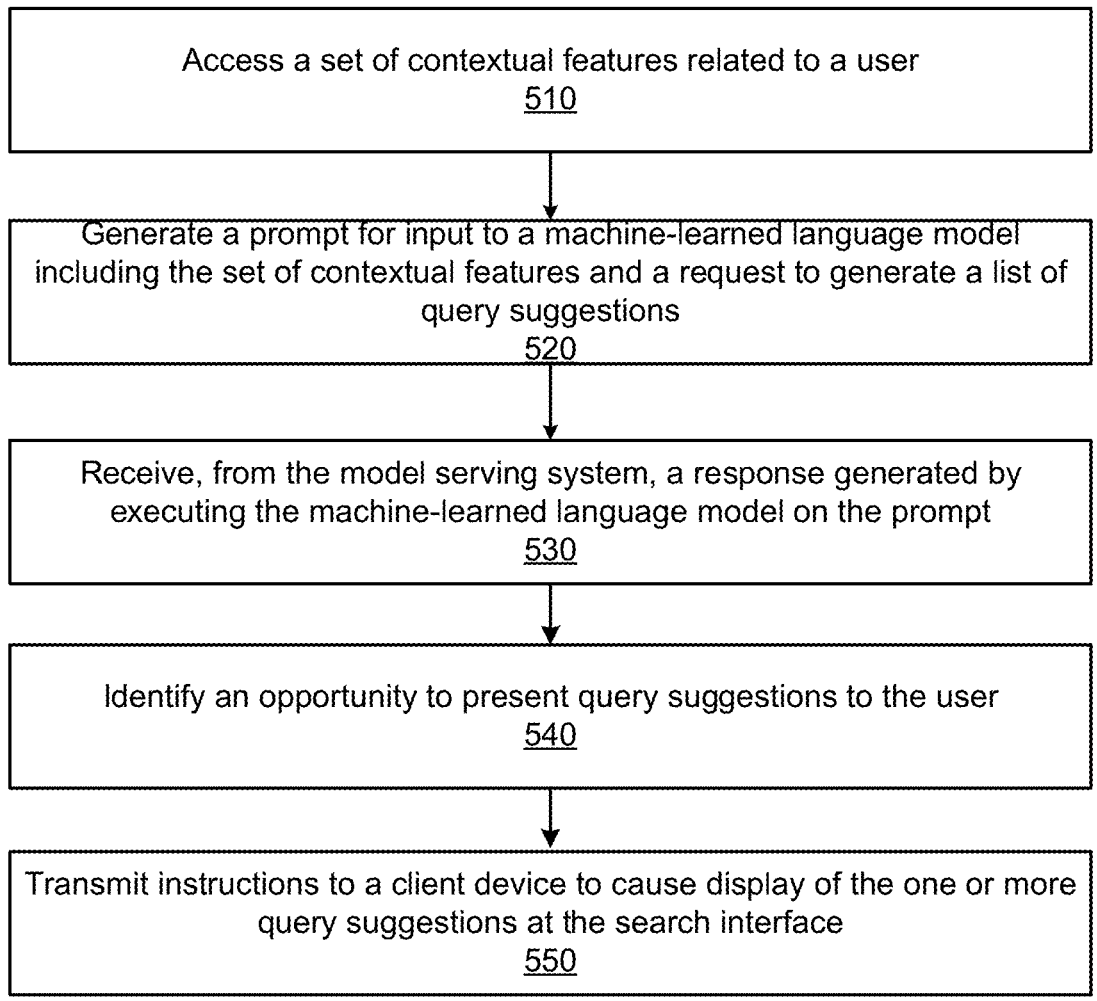
FIG. 5 is a flowchart for a method of generating query suggestions in conjunction with a large-language model (LLM), in accordance with one or more embodiments.

FIG. 5 is a flowchart for a method for generating end-to-end (E2E) a set of query suggestions that are relevant to a user using an LLM, in accordance with some embodiments. Alternative embodiments may include more, fewer, or different steps from those illustrated in FIG. 5, and the steps may be performed in a different order from that illustrated in FIG. 5. These steps may be performed by an online system (e.g., online system 140). Additionally, each of these steps may be performed automatically by the online system without human intervention.

The online system 140 accesses 510 a set of contextual features. In one or more embodiments, the contextual features include user data (e.g., previous queries submitted by a user, items previously purchased by the user), a persona of the user, and/or one or more items in the cart of the user. The contextual features may also include one or more features related to the retailer the user is performing the search session for. The online system generates 520 a prompt for input to a machine-learning language model, the prompt specifying at least the set of contextual features and a request to generate one or more query suggestions that are relevant to the user given the contextual features.

The online system 140 receives 530, from the model serving system, a response generated by executing the machine-learning language model on the prompt. The online system 140 identifies 540 an opportunity to present query suggestions to the user. For example, the opportunity may be when the user clicks on a search field of the online system 140. The online system 140 transmits 550 instructions to a client device to cause display of the one or more query suggestions at the search interface. Responsive to the user interacting with the one or more query suggestions, the online system stores user engagement data, and may retrain the machine-learning language model based on the user engagement data.

Figure 6:
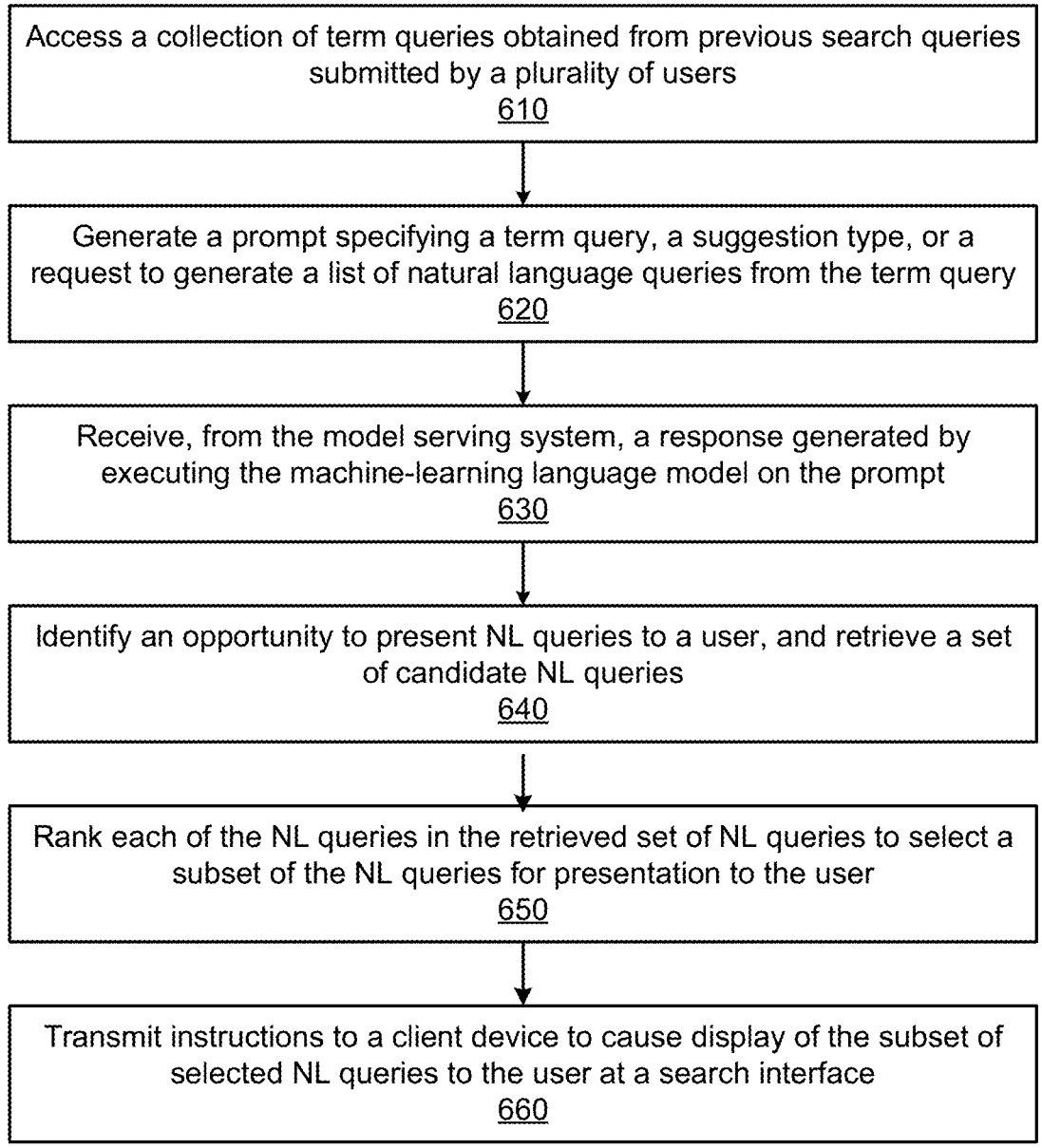
FIG. 6 is a flowchart for a method of generating natural language (NL) query suggestions, in accordance with one or more embodiments.

FIG. 6 is a flowchart for a method for generating one or more NL queries relevant to a user, in accordance with one or more embodiments. Alternative embodiments may include more, fewer, or different steps from those illustrated in FIG. 6, and the steps may be performed in a different order from that illustrated in FIG. 6. These steps may be performed by an online system (e.g., online system 140). Additionally, each of these steps may be performed automatically by the online system without human intervention.

The online system accesses 610 a collection of term queries. In one or more embodiments, the term queries may be obtained from previous search queries submitted by a plurality of users of the online system 140, and may be keyword-based queries. The online system 140 generates 620 a prompt for input to a machine-learning language model. The prompt may specify at least a term query, a suggestion type, and/or a request to generate one or more natural language (NL) queries from the term query.

The online system 140 receives 630, from the model serving system, a response generated by executing the machine-learning language model on the prompt, the response comprising the one or more NL queries. This process may be repeated for other term queries in the collection. The online system 140 identifies 640 an opportunity to present NL queries to a user, and retrieves a set of candidate NL queries based on, for example, prefix of a user submitted query or previous purchase history or items in the cart of the user. The online system 140 ranks 650 the set of candidate NL queries to select a subset of the NL queries for presentation to the user. The online system 140 transmits 660 instructions to a client device to cause display of the subset of selected NL queries to the user.

Additional Considerations

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
obtaining a collection of query suggestions from previous search queries submitted to a search interface of an online system;
for each query suggestion in the collection of query suggestions:
generating a prompt for input to a machine-learning text-to-image model, the prompt specifying at least the query suggestion, and a request to generate one or more query images for the query suggestion;
receiving a response generated by executing the machine-learning text-to-image model on the prompt to obtain the one or more query images;
obtaining a set of query images for the query suggestion, the set of query images including at least the one or more query images obtained from the machine-learning text-to-image model,
wherein parameters of the machine-learning text-to-image model is fine-tuned by:
generating a training prompt, the training prompt specifying a request to generate a query image for a query suggestion;
applying a base model to the training prompt to generate a base query image;
applying the machine-learning text-to-image model to the training prompt to generate an estimated query image;
generating a reward for at least the estimated query image by applying a reward model to the training prompt and the estimated query image; and
fine-tuning the parameters of the machine-learning text-to-image model based on the reward;
identifying, for a user, an opportunity to present at least one query suggestion from the collection of query suggestions;
ranking the respective set of query images associated with the at least one query suggestion to select an image for presentation to the user; and
transmitting instructions to a client device to cause display of the at least one query suggestion and the selected image at the search interface.

2. The method of claim 1, wherein obtaining the set of query images for the query suggestion further comprises:
retrieving, from a catalog database, one or more item images related to the query suggestion, wherein the set of query images for the query suggestion include the one or more item images retrieved from the catalog database.

3. The method of claim 1, wherein ranking the respective set of query images for the at least one query suggestion further comprises:
obtaining a set of contextual features related to the user or the at least one query suggestion;
applying a machine-learning ranking model to the set of contextual features and the respective set of query images to generate a set of scores; and
ranking the respective set of query images based on the set of scores, wherein the selected image is associated with a score above a predetermined threshold.

4. The method of claim 3, further comprising:
obtaining a set of training examples, a training example in the set including a query image associated with a previous query suggestion, a training set of contextual features, and engagement data for the previous query suggestion and the query image; and
training parameters of the machine-learning ranking model using the set of training examples.

5. The method of claim 4, wherein the engagement data for the previous query suggestion and the query image indicates whether a user clicked on the previous query suggestion or whether a user added an item to a user's cart after interacting with the previous query suggestion.

6. The method of claim 1, further comprising:
generating a loss function including a first loss indicating a difference between the estimated query image and the base query image, and a second loss indicating the reward for the estimated query image, and wherein the parameters of the machine-learning text-to-image model are fine-tuned based on the loss function.

7. The method of claim 1, wherein the at least one query suggestion and the selected image are displayed in a drop-down interface element disposed below a search field of the search interface, wherein the selected image is displayed adjacent to the at least one query suggestion.

8. A non-transitory computer-readable medium storing instructions that, when executed by one or more processors, cause the one or more processors to perform steps comprising:
obtaining a collection of query suggestions from previous search queries submitted to a search interface of an online system;
for each query suggestion in the collection of query suggestions:
generating a prompt for input to a machine-learning text-to-image model, the prompt specifying at least the query suggestion, and a request to generate one or more query images for the query suggestion;
receiving a response generated by executing the machine-learning text-to-image model on the prompt to obtain the one or more query images;
obtaining a set of query images for the query suggestion, the set of query images including at least the one or more query images obtained from the machine-learning text-to-image model,
wherein parameters of the machine-learning text-to-image model is fine-tuned by:
generating a training prompt, the training prompt specifying a request to generate a query image for a query suggestion;

applying a base model to the training prompt to generate a base query image;
applying the machine-learning text-to-image model to the training prompt to generate an estimated query image;
generating a reward for at least the estimated query image by applying a reward model to the training prompt and the estimated query image; and
fine-tuning the parameters of the machine-learning text-to-image model based on the reward;
identifying, for a user, an opportunity to present at least one query suggestion from the collection of query suggestions;
ranking the respective set of query images associated with the at least one query suggestion to select an image for presentation to the user; and
transmitting instructions to a client device to cause display of the at least one query suggestion and the selected image at the search interface.

9. The non-transitory computer-readable medium of claim 8, wherein obtaining the set of query images for the query suggestion further comprises:
retrieving, from a catalog database, one or more item images related to the query suggestion, wherein the set of query images for the query suggestion include the one or more item images retrieved from the catalog database.

10. The non-transitory computer-readable medium of claim 8, wherein ranking the respective set of query images for the at least one query suggestion further comprises:
obtaining a set of contextual features related to the user or the at least one query suggestion;
applying a machine-learning ranking model to the set of contextual features and the respective set of query images to generate a set of scores; and
ranking the respective set of query images based on the set of scores, wherein the selected image is associated with a score above a predetermined threshold.

11. The non-transitory computer-readable medium of claim 10, the steps further comprising:
obtaining a set of training examples, a training example in the set including a query image associated with a previous query suggestion, a training set of contextual features, and engagement data for the previous query suggestion and the query image; and
training parameters of the machine-learning ranking model using the set of training examples.

12. The non-transitory computer-readable medium of claim 11, wherein the engagement data for the previous query suggestion and the query image indicates whether a user clicked on the previous query suggestion or whether a user added an item to a user's cart after interacting with the previous query suggestion.

13. The non-transitory computer-readable medium of claim 8, the steps further comprising:
generating a loss function including a first loss indicating a difference between the estimated query image and the base query image, and a second loss indicating the reward for the estimated query image, and wherein the parameters of the machine-learning text-to-image model are fine-tuned based on the loss function.

14. The non-transitory computer-readable medium of claim 8, wherein the at least one query suggestion and the selected image are displayed in a dropdown interface element disposed below a search field of the search interface, wherein the selected image is displayed adjacent to the at least one query suggestion.

15. A computer system, comprising:
one or more processors; and
a non-transitory computer-readable medium storing instructions that, when executed by the one or more processors, cause the one or more processors to perform steps comprising:
obtaining a collection of query suggestions from previous search queries submitted to a search interface of an online system;
for each query suggestion in the collection of query suggestions:
generating a prompt for input to a machine-learning text-to-image model, the prompt specifying at least the query suggestion, and a request to generate one or more query images for the query suggestion;
receiving a response generated by executing the machine-learning text- to-image model on the prompt to obtain the one or more query images;
obtaining a set of query images for the query suggestion, the set of query images including at least the one or more query images obtained from the machine-learning text-to-image model,
wherein parameters of the machine-learning text-to-image model is fine- tuned by:
generating a training prompt, the training prompt specifying a request to generate a query image for a query suggestion;
applying a base model to the training prompt to generate a base query image;
applying the machine-learning text-to-image model to the training prompt to generate an estimated query image;
generating a reward for at least the estimated query image by applying a reward model to the training prompt and the estimated query image; and
fine-tuning the parameters of the machine-learning text-to-image model based on the reward;
identifying, for a user, an opportunity to present at least one query suggestion from the collection of query suggestions;
ranking the respective set of query images associated with the at least one query suggestion to select an image for presentation to the user; and
transmitting instructions to a client device to cause display of the at least one query suggestion and the selected image at the search interface.

16. The computer system of claim 15, wherein obtaining the set of query images for the query suggestion further comprises:
retrieving, from a catalog database, one or more item images related to the query suggestion, wherein the set of query images for the query suggestion include the one or more item images retrieved from the catalog database.

17. The computer system of claim 15, wherein ranking the respective set of query images for the at least one query suggestion further comprises:
obtaining a set of contextual features related to the user or the at least one query suggestion;
applying a machine-learning ranking model to the set of contextual features and the respective set of query images to generate a set of scores; and
ranking the respective set of query images based on the set of scores, wherein the selected image is associated with a score above a predetermined threshold.

18. The computer system of claim 17, the steps further comprising:
 obtaining a set of training examples, a training example in the set including a query image associated with a previous query suggestion, a training set of contextual features, and engagement data for the previous query suggestion and the query image; and
 training parameters of the machine-learning ranking model using the set of training examples.

\* \* \* \* \*